Figure 1:
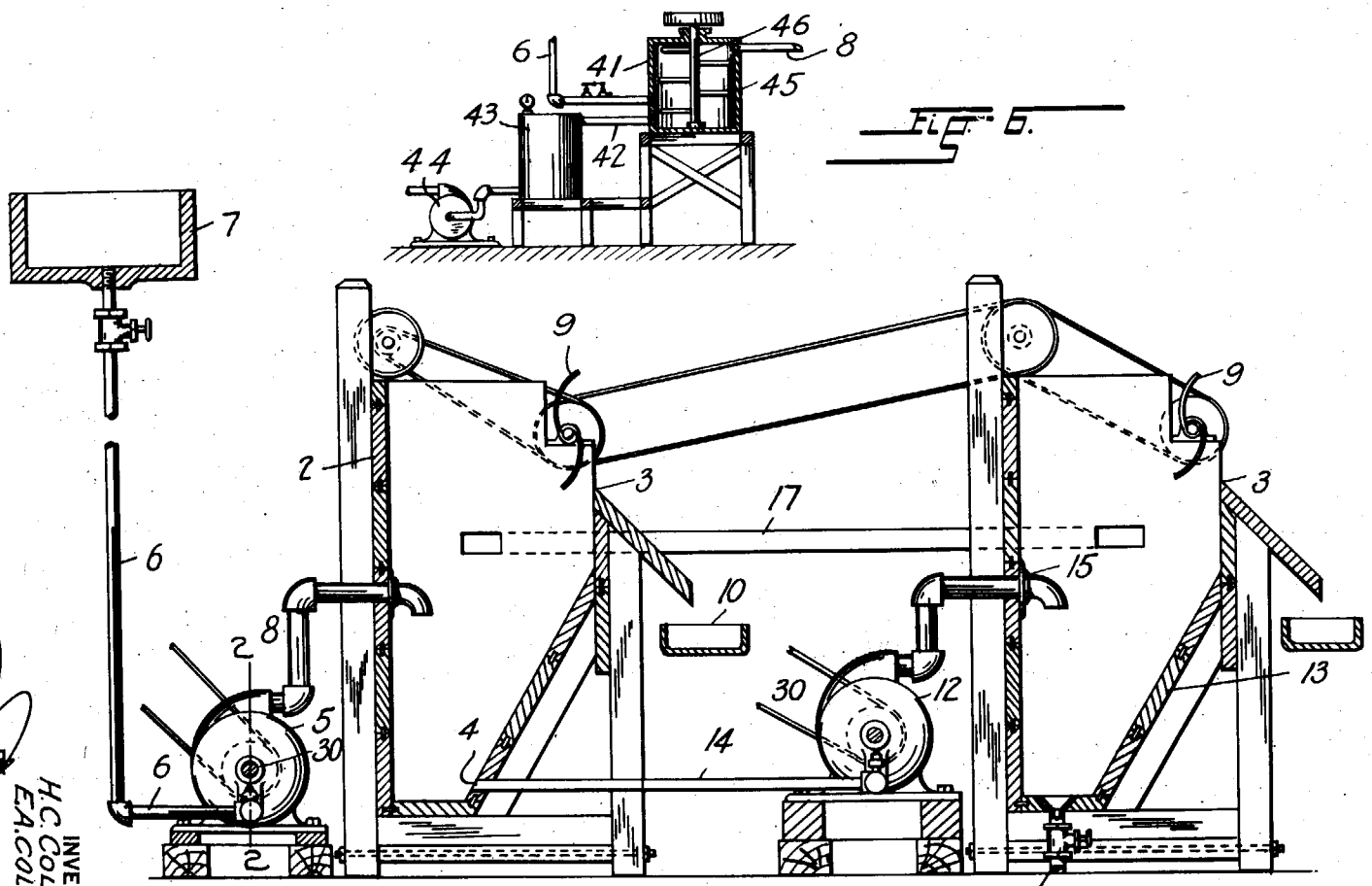

H. C. & E. A. COLBURN.

ORE FLOTATION PROCESS.

APPLICATION FILED JAN. 19, 1918.

Reissued July 30, 1918.

14,497.

2 SHEETS—SHEET 1.

INVENTORS
H. C. COLBURN and
E. A. COLBURN
BY
ATTORNEY

H. C. & E. A. COLBURN.

ORE FLOTATION PROCESS.

APPLICATION FILED JAN. 19, 1918.

Reissued July 30, 1918.

14,497.

2 SHEETS—SHEET 2.

INVENTOR
H. C. COLBURN and
E. A. COLBURN
BY
ATTORNEY

UNITED STATES PATENT OFFICE.

HERBERT C. COLBURN, OF COLORADO SPRINGS, AND ERNEST A. COLBURN, OF DENVER, COLORADO; SAID HERBERT C. COLBURN ASSIGNOR TO SAID ERNEST A. COLBURN.

ORE-FLOTATION PROCESS.

14,497. Specification of Reissued Letters Patent. Reissued July 30, 1918.

Original No. 1,226,062, dated May 15, 1917, Serial No. 100,947, filed May 31, 1916. Application for reissue filed January 19, 1918. Serial No. 212,797.

*To all whom it may concern:*

Be it known that we, HERBERT C. COLBURN and ERNEST A. COLBURN, citizens of the United States of America, residing, respectively, at Colorado Springs, in the county of El Paso and State of Colorado, and at Denver, in the county of Denver and State of Colorado, have invented certain new and useful Improvements in Ore-Flotation Processes, of which the following is a specification.

Our invention relates to improvements in the ore concentration process commonly known as the "flotation process," and its primary object resides in providing a novel method of separating the valuable mineral particles in finely divided ores by the production of a froth in which said particles are entrapped, exclusive of the gangue or worthless matter with which they were associated.

Our improved process consists in intermixing the finely divided ore with a liquid and a substance, preferably an oil, which has a selective affinity for the valuable particles, and subjecting this mixture together with air or other gas to violent agitation in a partial vacuum.

The vacuum expands the envelops of gas and colloidal matter which are broken up by a constant bombardment of the particles on the parts of a mechanical agitator.

The bared sulfids are immediately coated with a selective substance and the solid particles of the ore are thoroughly intermixed with the air and are in this condition discharged into a settling chamber in which the mixture is brought to a comparative condition of rest under higher pressure.

As a result of these conditions the coated particles rise naturally and easily to the surface, while the gangue settles to the bottom of the vessel and is drawn off. The air or other gas mixed with the solids also rises to the surface in a multitude of small bubbles and congregates with the oil or other selective substance into a heavy tenacious froth in which the valuable mineral particles are entrapped.

We are aware that apparatus have been devised in which ore-pulp, oil and air are intermixed by being drawn through a suction pump which delivers the mixture into the settling chamber, and it should be understood that the action to which the materials are subjected in an apparatus of this character differs widely from that which produces the perfect intermixture obtained in the practice of our improved method of agitation.

In this method the pulp is, as before explained, intermixed with a selective substance and air in a partial vacuum and instead of being rapidly circulated through the chamber in which the intermixture takes place, as in the pumping system hereinbefore referred to, it is retained in the mixing chamber until a thorough intermixture of the materials is obtained.

Without limiting ourselves to the employment of any particular apparatus for effecting the intermixture of the materials, we prefer to use, by reason of the simplicity of its construction, a chamber in which an agitating element has a rotary movement and which has an inlet of at most one-fourth the area of its outlet.

By the difference in sizes of the ingress and egress openings, a partial vacuum is constantly maintained in the mixing chamber while the rotating element impregnates the ore-pulp with the selective substance and the air which may be admitted to the chamber through openings the flow through which may be controlled by automatically regulated valves.

The intake-opening of the chamber connects with a supply of ore sufficiently elevated to produce a head which feeds the material through the system in ratio to the discharge of the separated substances, and the outlet opening of the chamber connects with a settling chamber which has an overflow for the froth and values in suspension and an outlet for the settling less valuable matter.

If so desired, a number of mixing chambers and settling chambers may be connected in a series for the repeated treatment of settling matter.

An apparatus of the above-described character has been shown in the accompanying drawings in the various views of which like parts are similarly designated and in which—

Figure 1 represents a sectional elevation of a succession of units each comprising a mixing chamber and a settling chamber as hereinabove described and coöperatively combined for the repeated treatment of the pulp.

Figure 2:
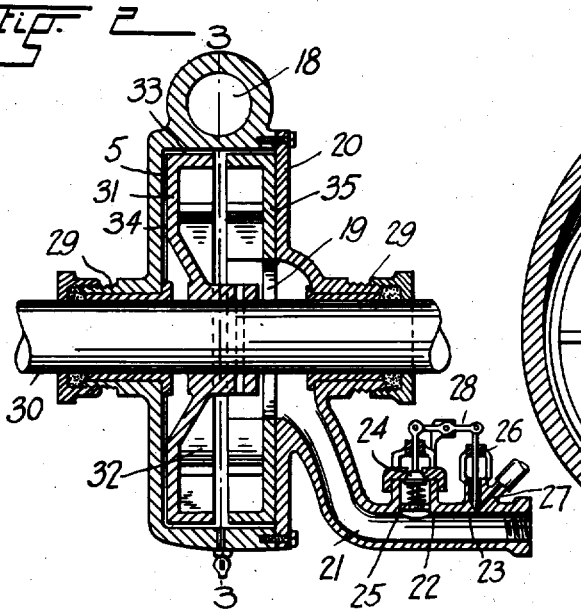

Fig. 2, an axial section through one of the mixing chambers shown in Fig. 1, taken along the line 2—2.

Figure 3:
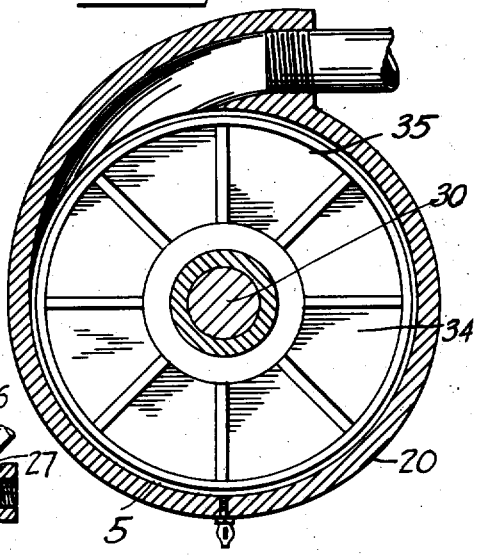

Fig. 3, a section along the line 3—3, Fig. 2.

Figure 4:
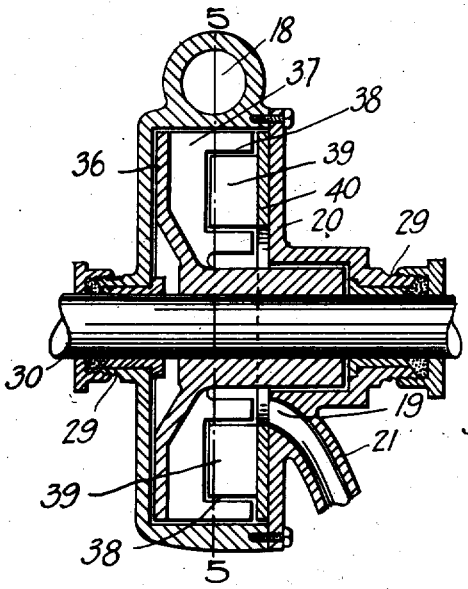

Fig. 4, a section similar to that shown in Fig. 2, showing a modified construction of the agitating element with the mixing chamber.

Figure 5:
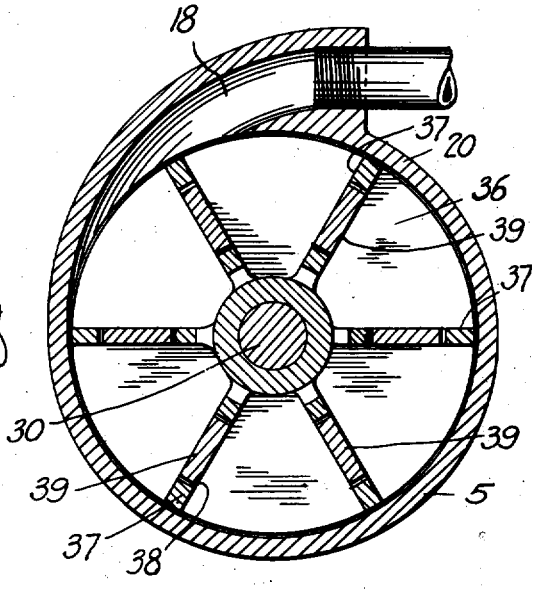

Fig. 5, a section taken along the line 5—5, Fig. 4, and

Fig. 6, a sectional elevation showing a modified method of producing a partial vacuum in the mixing chamber.

Referring first to Fig. 1 of the drawings, 2 designates the settling chamber of the apparatus which is preferably made in the form of a spitzkasten having at its upper end an overflow 3 for the froth produced in the flotation process, and adjacent its bottom an outlet 4 for settling matter.

The reference numeral 5 designates a mixing chamber provided with an inlet which by means of a conduit 6 is connected with an elevated source of ore-supply 7, and with an outlet of comparatively large diameter which connects with a conduit 8 extending into the settling chamber for the discharge of the material thereinto.

A rotary skimmer 9 mounted adjacent the overflow assists the movement of the supernatant froth into a launder 10.

In the construction shown in the drawings, a second mixing chamber 12 and a second settling chamber 13 are operatively connected with the first-described devices for the repeated treatment of the matter discharged through the outlet 4 of the first settling chamber.

The outlet 4 is to this end connected with the intake pipe 14 of the second mixing chamber and the outlet of the latter connects with a conduit 15 which discharges into the second settling chamber 13.

The material settling in the last-mentioned chamber is discharged through a valve-controlled outlet 16 at the bottom thereof.

In this connection we desire it understood that a repeated treatment of the ore is required only under unusual circumstances and that in most cases a single treatment of the ore is sufficient to extract practically all the values it contains.

The two settling chambers shown in Fig. 1 are connected by a conduit 17 for maintaining their liquid contents on an even level.

Now, referring to Figs. 2 and 3 of the drawings, the mixing chamber 5 is composed of a cylindrical casing 20 which has at its upper end a tangentially disposed outlet-opening 18 and in one of its sides a central inlet-opening 19.

The last-mentioned opening connects with a nozzle 21 the cross-sectional area of which is less than one-fourth the area of the outlet-opening and to which is attached the conduit 6 shown in Fig. 1.

The nozzle has an opening 22 for the admission of air, and a second opening 23 for the inlet of oil or other selective substance. The flow through the air-opening is controlled by a valve 24 which is yieldingly held upon its seat against atmospheric pressure, by a spring 25.

The flow through the opening 23 is controlled by a needle-valve 26 which opens and closes the outlet of a branch 27 which connects with a conveniently located source of supply, and the two valves are connected for synchronous movement by means of a lever 28.

It will be seen that in the operation, air is admitted past the valve 24 while at the same time a proportionate quantity of oil or other selective substance is introduced into the material passing through the nozzle, through the opening 23.

The spring 25 is made of sufficient strength to maintain the vacuum in the mixing chamber, constantly at a predetermined pressure.

The casing 20 has at its opposite sides, centrally disposed, axially alined stuffing boxes 29 through which passes a shaft 30 which imparts a rotary movement to the mixing element within the chamber 5.

This element consists in the construction shown in Figs. 2 and 3, of a member 34 which is composed of a disk 31 fixed on the shaft adjacent a side of the chamber, and provided with a plurality of radially extending vanes 32 which at their outer ends are connected by a circumferential flange 33.

A second member 35 which in construction is identical to the before-described member 34, is fixed in the casing against the opposite side of the chamber 5, and the two opposed members coöperate to thoroughly intermix the materials introduced into the chamber, by a rapid rotary motion of the one with relation to the other.

The device shown in Figs. 3 and 4, differs from the previously described form, only in the construction of the coöperative members of the mixing element.

The member mounted on the shaft 30 consists in this form, of a disk 36 and a series of radial vanes 37 which in their outer longitudinal edges, have recesses 38 to admit correspondingly formed tongues 39 on the fixed member 40 at the opposite side of the chamber.

During rotation of the shaft these tongues pass through the recesses of the rapidly rotating element and thereby assist in effecting a thorough intermixture and comminution of the materials.

From the before-going description the operation of the apparatus will be readily understood.

The ore entering the mixing chamber being agitated in the partial vacuum produced by the difference in the areas of the inlet and outlet-openings of the same, is thoroughly impregnated with the oil or other substance entering through the opening 23, while the air entrained by the ore-pulp during its passage into the chamber, or admitted through the opening 22 of the nozzle 21, is finely disseminated throughout the agitated mass.

The partial vacuum in the mixing chamber expands the envelops of gas and colloidal matter which are subsequently broken by contact with the blades of the mechanical mixer.

The consequently bared sulfid particles are coated with the selective substance and the solid constituents of the pulp including the gangue or worthless matter from which the sulfids are separated, are thoroughly intermixed with the air or other gas either contained in the ore-pulp or separately admitted to the nozzle 21, which is atomized by the partial vacuum maintained in the mixing chamber.

The partial vacuum also expands and dissipates the gases present in the ore and thereby removes one of the chief causes for failure in many of the flotation processes at present in use, it being well known that gases in ore-pulp float the gangue and thus oppose a clean separation.

The mixture discharged from the mixing chamber enters the settling chamber in which it is brought to a comparative condition of rest and in which the coated sulfid particles and atomized air rise to the surface where they congregate into a heavy tenacious froth, in which the values contained in the ore are entrapped.

The froth is removed from the surface of the material through the overflow and the gangue or worthless matter settling in the bottom of the chamber is discharged through the outlet 16.

The settling material may be conveyed to the dump or conducted to a second mixing chamber and a second settling-chamber, as the circumstances and the character of the ore may require.

In the construction shown in Fig. 6, a mixing chamber 41 is connected by means of a conduit 42 with a reservoir 43 in which a vacuum of determinate pressure is maintained by a suction-pump 44.

The mixing element in this form of the apparatus consists of a series of paddles 45 which radiate from a rotary vertical shaft 46.

In the operation of the modified form of the apparatus, a partial vacuum is maintained in the reservoir 43 and the therewith communicating chamber 41 by the action of the vacuum pump 44.

The materials in the chamber are thoroughly intermixed by the rotary movement of the blades 45 on the shaft 46 it being observed that as in the operation of the first-described apparatus, the gaseous envelops and colloidal matter are broken up by the partial vacuum, and a fine intermixture of the different substances is obtained, which results in a product consisting of the sulfid particles of ore adhering to the selective substance, the gangue from which the coated particles are cleanly divided, and air which is thoroughly atomized throughout the finely divided mass.

The advantages of our improved method of producing the froth in a flotation ore-separating process, have been fully discussed in the first part of this description, and it is only necessary to add that by the automatic regulation of the addition of air and the admission of the selective substance through the medium of the connected valves, the apparatus may be operated without requiring the constant attention of expert operators and that by reason of the comminution of the ore and its thorough intermixture with the air and added substance in a finely divided state, many substances which otherwise would be unsuited for the purpose, may be employed to produce a froth of the desired tenacity.

Having thus described our invention, what we claim and desire to secure by Letters-Patent is:

1. The process of separating ores by flotation consisting in emulsifying and scouring ore-pulp containing a selective substance and an added gas, while it is maintained under a pressure less than atmospheric, and admitting the product to a liquid-body under higher pressure, so as to permit of an upward movement of buoyant particles to the surface thereof.

2. The process of separating ores by flotation consisting in emulsifying and scouring ore-pulp containing an oil and an added gas, while it is maintained under a pressure less than atmospheric, and admitting the product to a liquid under higher pressure, so as to permit of an upward movement of buoyant particles to the surface thereof.

3. The process of separating ores by flotation consisting in emulsifying and scouring ore-pulp containing air and a selective substance, while it is maintained under a pressure less than atmospheric, and admitting the product to a liquid under higher pressure, so as to permit of an upward movement of buoyant particles to the surface thereof.

4. The process of separating ores by flotation consisting in emulsifying and scouring ore-pulp containing air and oil, while it is maintained under a pressure less than atmospheric, and admitting the product to a liquid under higher pressure, so as to permit of an upward movement of buoyant particles to the surface thereof.

Signed at Denver, in the county of Denver, and State of Colorado, this 8th day of January, 1918.

HERBERT C. COLBURN.
ERNEST A. COLBURN.

In the presence of two witnesses:
J. B. BANTON,
B. L. GORICH.